United States Patent [19]
Shogren

[11] 4,368,976

[45] Jan. 18, 1983

[54] VARIABLE SPEED SCANNING SYSTEM

[75] Inventor: David K. Shogren, Ontario, N.Y.

[73] Assignee: Xerox Corporation, Stamford, Conn.

[21] Appl. No.: 241,968

[22] Filed: Mar. 9, 1981

[51] Int. Cl.[3] ........................................ G03B 27/52

[52] U.S. Cl. ........................................ 355/55; 355/8; 355/57

[58] Field of Search ........................ 355/57, 56, 55, 8

[56] References Cited

U.S. PATENT DOCUMENTS

| | | | |
|---|---|---|---|
| 1,344,896 | 6/1920 | Jobke | 355/55 |
| 1,726,350 | 8/1929 | Hershberg | 355/56 |
| 3,049,968 | 8/1962 | Johanson | 355/55 |
| 3,146,661 | 9/1964 | Young | 355/57 |
| 3,542,467 | 11/1970 | Ferguson et al. | 355/8 |
| 3,694,060 | 9/1972 | Tadie | 352/14 |
| 3,778,147 | 12/1973 | Reehil et al. | 355/8 |
| 3,884,574 | 5/1975 | Doi et al. | 355/66 |
| 3,897,148 | 7/1975 | Ritchie et al. | 355/57 |
| 4,013,361 | 3/1977 | Allis | 355/60 |
| 4,027,963 | 6/1977 | Hoppner et al. | 355/8 |
| 4,029,409 | 6/1977 | Spinelli | 355/51 |
| 4,032,231 | 6/1977 | Zucker | 355/60 |
| 4,093,374 | 6/1978 | Zucker et al. | 355/57 |
| 4,095,880 | 6/1978 | Shogren et al. | 355/8 |
| 4,105,326 | 8/1978 | Mochimaru | 355/55 |
| 4,120,578 | 10/1978 | Daniels et al. | 355/8 |
| 4,124,293 | 11/1978 | Daniels et al. | 355/58 |
| 4,142,793 | 3/1979 | Schilling | 355/58 |
| 4,279,497 | 7/1981 | Satomi | 355/57 |

FOREIGN PATENT DOCUMENTS

| | | | |
|---|---|---|---|
| 926395 | 5/1963 | United Kingdom | 355/55 |

*Primary Examiner*—Monroe H. Hayes

[57] ABSTRACT

A drive for providing a continuous range of magnifications in a copier system. The drive includes a variable speed transmission whose output can be adjusted over a continuous range and then fixed to produce a constant scan rate for transmitting a document image to a photoreceptor. The transmission has two pairs of angled or conical capstans coupled by drive belts or cables whose initial position with respect to the capstans dictate the transmission speed. To change speed the transmission is decoupled from a copier drive motor and one capstan pair is rotated with respect to the second pair. The velocity profile of the rotated pair is thereby charged to produce a desired change in magnification. An alternate embodiment is disclosed wherein a cam and cam following surface in conjunction with a single angled or conical capstan provide the adjustable scanning drive.

7 Claims, 10 Drawing Figures

VARIABLE SPEED SCANNING SYSTEM

BACKGROUND OF THE INVENTION

1. Field of the Invention

This invention relates to a variable magnification reproduction machine and, more particularly to an optical scanning system which provides the capability of attaining continuous changes in scanning rates to provide a range of magnification.

2. Prior Art

In variable magnification reproduction machines having scanning optical systems, the selection of a desired magnification value is generally associated with a corresponding selection of optical scanning speed and distance of travel. In such machines, to obtain smaller magnification ratios, a document is scanned at a faster rate and the distance of travel is simultaneously extended so that a larger document may be reproduced using the available photoreceptive surface. Prior art machines which provide for scanning systems adapted for operation with discrete values of magnification changes are disclosed in representative U.S. Pat. Nos. 3,542,467, 3,614,574, 3,778,147, 3,884,574, 3,897,148, 4,142,793 and 4,027,963. Scanning systems which can accommodate a greater range of reduction values are disclosed in U.S. Pat. Nos. 4,124,293 and 4,093,374, both of which uses a plurality of cams connected to the drive system. Each cam provides a drive speed specific to a given reduction.

It is desirable to provide a greater range of continuous speed changes to a scanning optics system for magnification control without recourse to increasing the number of drive cams. Such systems have been provided as shown in U.S. Pat. Nos. 4,120,578 and 4,095,880. Both patents disclose a drive cam shaped so as to provide a constant velocity to the optics drive carriage of the particular system. In each patent, cam follower means are adapted to provide continuous variations in scan velocity depending on the reduction mode initiated.

In the '880 patent this scan rate change is accomplished by changing the orientation of a cam follower arm by moving a yoke along a rail. In the '578 patent, a drive carriage was mounted in a track which was positioned in a continuously variable manner along a lead screw. These systems provide the desired solutions but at a price of increased cost and complexity.

It is therefore desirable to provide a scanning optics system which will provide continuous variable scanning speeds consistent with a wide range of reduction values and which will accomplish this purpose in an efficient, relatively inexpensive and simple manner.

SUMMARY OF THE INVENTION

The present invention features method and apparatus for providing a continuously variable speed change to a drive mechanism without the need for complex techniques used in the prior art. The costs for producing a variable speed drive embodying the present invention are therefore lower, while the reliability of the drive system is maintained.

The invention has particular utility in a variable magnification reproduction machine. Such a machine has a platen for supporting a document, an image receptor for receiving an image of the document, such as a photoreceptor or the like and optics for directing the image along an optical path to the photoreceptor. To selectively transmit document image portions to the moving photoreceptor scan means are provided for controlling the speed at which the image portions are directed along the optical path. The scan means includes a variable speed drive for coupling a constant speed source of rotational energy such as the reproduction machine's main drive shaft to means for scanning the document. The variable speed drive has a tapered capstan rotatably mounted to the machine which coacts with drive means coupleable to the motor or source and to the scan means.

When the drive motor is energized and the drive mechanism is engaged, a cable or belt wound about the capstan is wound or unwound with a variable speed but due to the shape of the capstan, this variable speed in cable motion becomes a constant speed of rotation suitable for driving the scan means at a constant rate. To change the scan speed the capstan is decoupled from the scan means and rotated to cause the cable to wind or unwind a controlled amount. Since the constant rate scan speed is dependent on the initial relation between the capstan and the belt this allows the scan rate to be continuously variable.

According to the preferred embodiment of the invention, the variable speed drive comprises a series of tapered capstans which coact through a spirally splined shaft. The capstans are divided into capstan pairs which are coupled together by suitable drive belts or cables. The shape of the capstan pairs is chosen such that a variable speed of rotational motion is generated by one capstan pair which is exactly counterbalanced by a second capstan pair. In this way, a constant speed input to the transmission or drive mechanism results in a constant speed output for driving the scan means. By selectively adjusting the initial position of one of the belts or cables about a capstan pair before rotation is initiated the constant speed of rotational motion applied to the output from the transmission can be adjusted according to the desired magnification rate of the copier.

The present invention can be utilized to either drive a movable optical system at a constant rate past a stationary platen, or alternatively can be used to drive an original document past a stationary scanning slit. In either embodiment the constant speed rotational motion imparted to the tapered capstans is used to provide rectilinear motion to an appropriate scan drive.

In a typical copier, the constant speed scan of the document image to the photoreceptor is followed by a high speed flyback during which the scanning system is caused to reverse directions and return to an initial position. To accomplish this, the preferred embodiment includes means for rapidly reversing the direction of capstan rotation to cause rapid flyback of the scan system.

According to an alternate embodiment of the invention, a single tapered capstan is used in the drive mechanism or transmission and the constant speed motor used to rotate the photoreceptor is coupled to the transmission through a camming surface designed to provide constant speed scanning. In this embodiment a pivotally mounted drive having a cam following surface which coacts with a cam driven by the motor is mounted to provide scan-inducing motion to a belt or cable which wraps around a single tapered capstan. As in the previously discussed embodiment of the invention, the initial speed of the drive is dependent upon the wrap position of the cable about the capstan. Pivoting of the drive mechanism about a pivot point initiates cable movement which, in turn, causes the capstan to rotate at a constant velocity.

This alternative embodiment can be quite easily modified to achieve discrete scanning capability for those applications where fixed magnification ratios in copying are desired. In this embodiment, the tapered capstan is replaced by a number of individual capstans each having constant radius exteriors which coact with cables driven by the pivotally mounted drive. For a particular magnification, a particular one of the plurality of capstans is coupled to a rotatable shaft to transmit power from the drive motor to the shaft at a constant speed. It should be appreciated, however, that in this embodiment the camming surface is different from the camming surface of the continuously variable speed system. In particular, when a constant radius capstan is rotated the drive cable must move with constant rectilinear speed as it unwinds from the capstan.

From the above it should be appreciated that one object of the invention is the provision of a constant speed continuously variable drive mechanism for introducing relative motion between a document and a document scanning mechanism. The invention achieves this goal through utilization of rotatable capstan coupled to the drive motor. The resultant drive is simplified yet reliable and can be produced at a cost less than prior art scanning systems. These and other objects and features of the present invention will become more clearly understood when a detailed description of alternate embodiments of the invention are disclosed in conjunction with the accompanying drawings.

DETAILED DESCRIPTION OF A PREFERRED EMBODIMENT OF THE INVENTION

Figure 1:
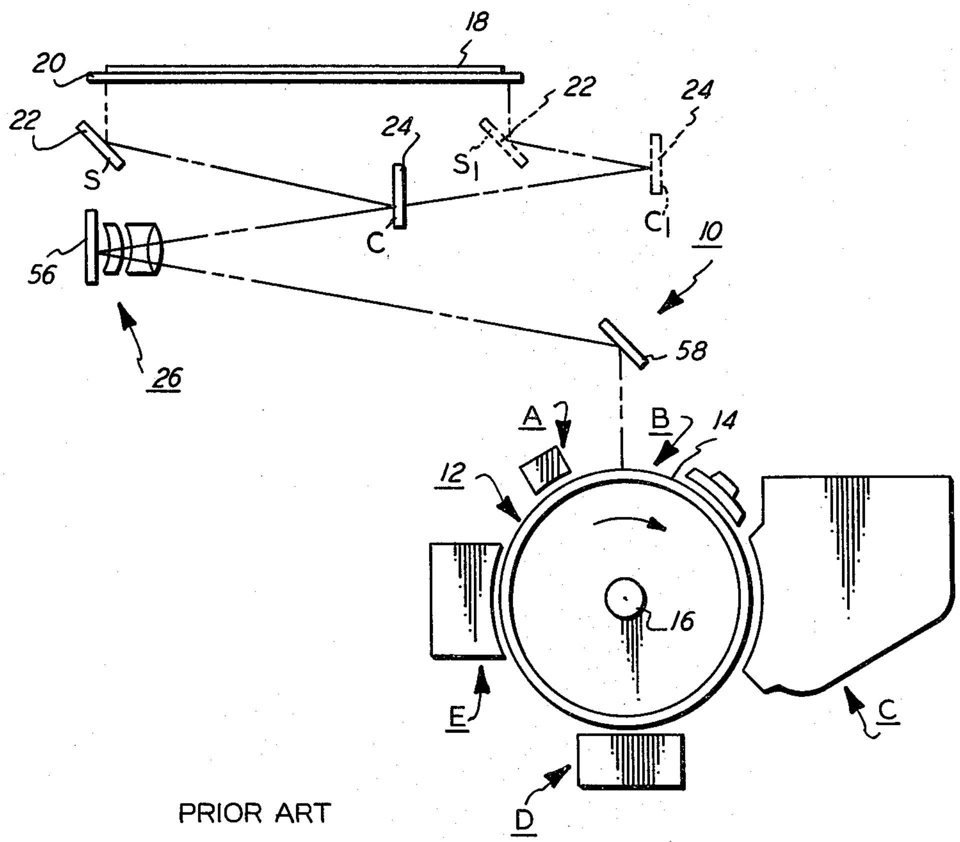
PRIOR ART FIG. 1
FIG. 1 is a schematic representation of a prior art optical scan system for transmitting an image of a document to a photoreceptor.

Turning now to the drawings, FIG. 1 of the present application shows a copier system 10 for reproducing an original document. The system 10 includes an image recording drum 12 having an outer surface upon which is coated a suitable photoconductive material 14. The drum, which is journaled for rotation within the machine frame by means of a shaft 16, rotates in the direction indicated to bring the photoconductive image recording surface thereon past a plurality of xerographic processing stations.

Since the practice of xerography is well known in the art, the various processing stations for producing a copy of an original are herein represented in FIG. 1 as blocks A–E. At station A, an electrostatic charge is placed uniformly over the surface of the moving photoconductive drum surface preparatory to receiving the light image of an original to be reproduced. The charged drum surface is then moved through an exposure station B, where a flowing light image of the original is recorded on the drum in a manner to be described in greater detail below. As a result of this imaging operation the charge of a drum surface is selectively dissipated in the light exposed region thereby recording the original input information on the photoconductive plate surface in the form of a latent electrostatic image. Next, in the direction of drum rotation, the latent image bearing surface is transported through a development station C wherein a toner material is applied to the charged surface thereby rendering the latent electrostatic image visible. The now developed image is brought into transfer relationship with a sheet of final support material, such as paper or the like, within a transfer station D wherein the toner image is electrostatically attracted from the photoconductive plate surface to the contacting side of the support sheet. Station E represents a mechanism for cleaning toner from the drum surface.

Figure 2:
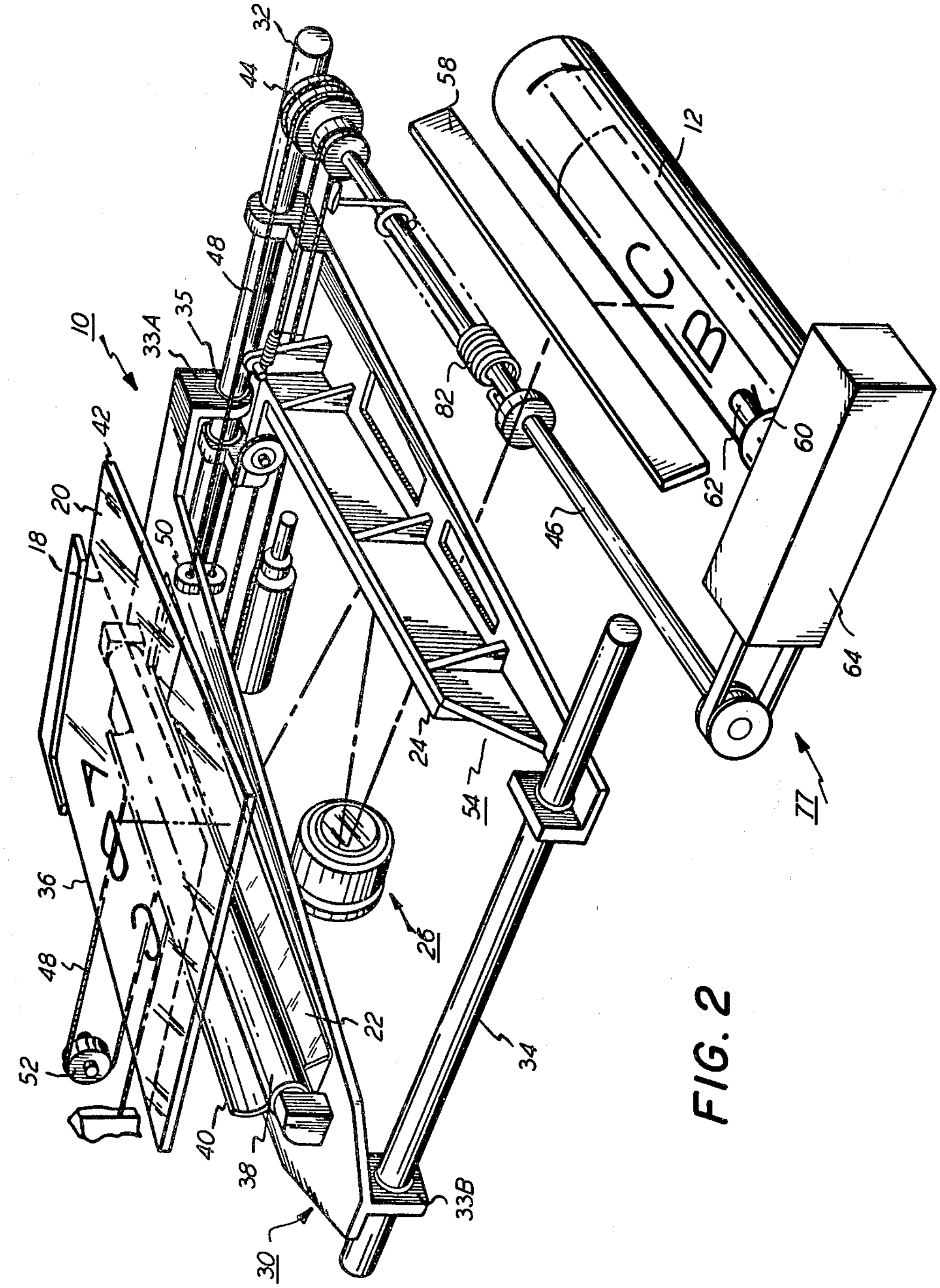
FIG. 2 is a perspective view shown a portion of the scan system driven by a main drive through a variable speed transmission.

Referring to FIGS. 1 and 2, scanning of a flat original document 18, supported on a platen 20, is accomplished by means of a first scanning mirror 22, a second compensating mirror 24 and an objective lens element 26. The scanning mirror 22 is supported upon a carriage 30 adapted to move back and forth over a prescribed horizontal path of travel below the platen surface. To this end, carriage 30 is slidably mounted upon a guide rail 32 by means of a carriage mount 33A and bushings 35. The outboard side of the carriage 30 is slidably freely mounted on parallel guide rail 34 by means of carriage mount 33B. The scanning mirror 22, as positioned upon the carriage, extends transversely across the platen surface in substantially parallel alignment with a platen start of scan margin 36. Mounted directly behind the scanning mirror on the carriage is an aperture lamp 38 and a reflector 40 which cooperate to illuminate a longitudinally extending incremental area upon the platen within the viewing domain of the scanning mirror 22. The carriage is adapted to move across the lower surface of the platen at a constant rate whereby the mirror 22 scans successive illuminated incremental areas on the platen beginning at the start of scan margin 36 and terminating at the opposite side of the platen at an end of scan margin 42.

A two drum pulley 44 is rigidly affixed to the inboard end of an optics drive shaft 46 and adapted to turn with the shaft. A main drive cable 48 is wrapped about a large diameter drum of the pulley 44 with one end of the cable anchored in the forward end of the carriage 30 by means of an adapter 50 and the opposite end of the cable passed about a reversing pulley 52, attached to the rear of the machine frame and being similarly secured to the back end of the same carriage. This particular arrangement makes the scanning carriage a part of the endless loop cable system whereby the carriage responds instantly and positively to any movement of the optic drive shaft 46. It is noted that in the illustrated embodiment the top and bottom segments of cable 48 lie parallel to one another in the same vertical plane although this is not a requirement.

A second movable carriage 54 is also provided upon which is supported the compensating mirror 24. The second carriage is also slidably mounted upon the guide rails 32, 34. The support mounts of the carriage 30 are arranged to move in non-interferring relationship with the support mounts of the second carriage 54 throughout the scanning operation. The compensating mirror 24 is positioned on the carriage 54 to receive reflected light rays emanating from the scanning mirror and redirecting these light rays to the lens element 26.

Two other mirrors 56, 58 are positioned intermediate the platen 20 and the image recording drum 12. The position of these mirrors 56, 58 is also movable and in particular is continuously variable to achieve continuous variable magnification in image size. The mirrors 56, 58 have been shown schematically positioned along an optical path to the recording drum 12. For a more detailed discussion of a preferred technique for driving these mirrors to insure properly focused images impinge the recording drum reference is made to U.S. Pat. No. 4,095,880. That patent is incorporated herein by reference.

A second position for the mirrors 22, 24 is shown in phantom in FIG. 1. During one complete scan, the first mirror 22 moves from a start of scan position (S) to an end of scan position (S') and back to its start of scan position. At the same time and in synchronism therewith, the compensating mirror 24 moves from its start of scan position (C) to an end of scan (C') and then returns to the start of scan position (C). As seen in FIG. 1, the angular orientation of the mirrors 22, 24 remains fixed during a scan cycle and only their position in relation to the platen 20 changes.

A drive motor 60 provides both rotational motion to the recording drum 12 and translational motion to the scanning mirrors 22, 24. The motor 60 comprises a constant speed motor for rotating the drum 12 at a constant rate. To provide continuous magnification, however, the shaft 46 must be driven with a continuous range of rotational speeds in order that the rate at which the mirror 22 scans the platen is continuously variable. To provide this capability, a motor driven shaft 62 which rotates at a constant speed is coupled to the optics drive shaft 46 through a transmission 64 whose output is continuously variable.

Figure 3:
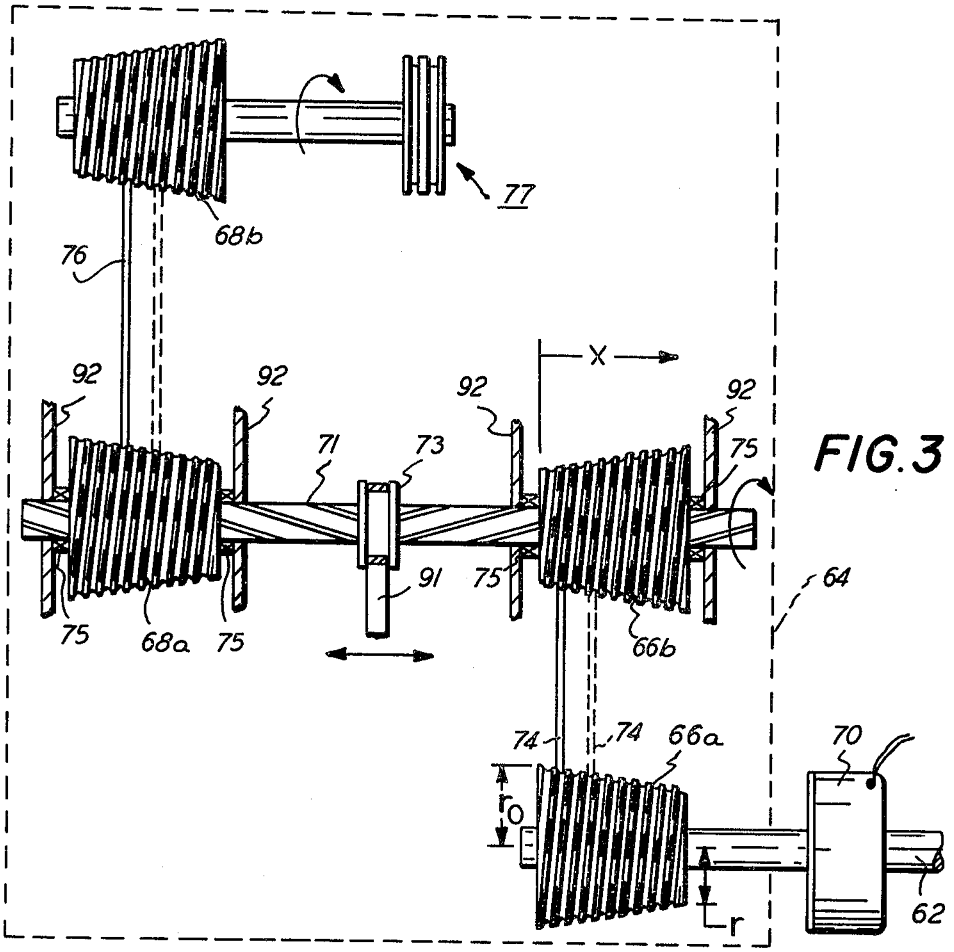
FIG. 3 shows a preferred embodiment of the variable speed transmission of FIG. 2.

The preferred transmission 64 is shown in FIG. 3 and comprises two capstan pairs 66*a, b* and 68*a, b*, mounted for rotation with respect to the copier, a clutch 70, and a spirally splined shaft 71 which couples the two capstan pairs. The clutch 70 connects the motor drive shaft 62 with a first capstan 66*a*. Rotation of this capstan 66*a* drives a second capstan 66*b* through a belt 74. Rotation of this second capstan 66*b* causes rotation of the capstan 68*a* through the splined shaft 71. A second belt 76 connects the capstans 68*a*, 68*b* so that that the capstan 68*b* rotates and in turn imparts rotational motion to the optics drive shaft 46 through a conventional pulley and drive belt arrangement 77.

The capstan pairs 66*a, b* and 68*a, b* are conical and define spiraling grooves along their length which coact with the belts 74, 76 respectively. Rotation of the first capstan 66*a* causes the first belt 74 to traverse the length of that capstan. As the belt 74 "walks" along the capstan 66*a* the capstan radius r (FIG. 3) decreases. To maintain the cable 74 taut, the second capstan 66*b* must increase in radius in a complimentary manner. The capstan pair 68*a, b* is arranged in a similar manner with one capstan increasing in radius as the second decreases.

In combination, the capstan pairs 66*a, b* and 68*a, b* provide an adjustable output to drive the scanning optics. It is instructive to examine the output of the second capstan 66*b* as a function of the input speed (w) of the motor drive shaft 62 and certain other parameters. The linear speed (v) of movement of the cable or belt 74 is given by the expression:

(1) $v=wr$, where $r$=radius of capstan 66*a* but (2) $r=r_o-cx$, where x is the distance from the end of the capstan (FIG. 3), c is a constant dependent on the shape of the capstan, and $r_o$ is the radius of the capstan at $x=o$. But v can also be expressed as a function of the speed of rotation of the second capstan 66*b*, namely, (3) $v=\Omega R$; where $\Omega$ is the output speed of the second capstan and R is the radius of the second capstan at the point where the belt 74 contacts the second capstan's groove. but:

(4) $R=R_o+kx$, where $R_o$ is the second capstan radius at $x=o$, k is a constant dependent on the second capstan shape and x is the distance along the capstan.

Equating the two expressions for v, the velocity of the belt, results in the expression:

(5) $\Omega\ (R_o+kx)=(r_o-cx)\ w$, so that in general $$\Omega = \frac{w(r_o - cx)}{R_o + kx} \qquad (6)$$

but if the cable 74 is to remain taut the constraint that $c=k$ must be imposed so that $$\Omega = \frac{w(r_o - kx)}{R_o + kx}\,. \qquad (7)$$

This is the expression for the output speed of rotation of the capstan 66*b*. This drive speed is coupled to the second capstan pair 68*a, b* through the shaft 71. If an opposite velocity profile is chosen for the capstan pair 68*a, b* the speed of rotation of the optics shaft 46 will be a constant dependent on the initial speed $\Omega_o$ of the second capstan 66*b*. The speed $\Omega_o$ is seen to depend on w the speed of the drive motor shaft 62 and $x_o$ the position along the capstan pair 66*a, b* of the belt 74.

In the FIG. 3 embodiment a change in speed is accomplished by moving both belts 74, 76 along their respective capstan pairs. The repositioning of the belts 74, 76 is achieved by operating a splined shaft position yoke 73 with the clutch 70 disengaged. The yoke 73 is slidable sideways and such sideways movement imparts sideways motion to the splined shaft 71 which, in turn, causes opposite sense rotations of the capstans 66*b*, 68*a*. This rotation causes the belts 74, 76 to "walk" to a new position (shown in phantom in FIG. 3) on the pairs 66*a, b*, and 68*a, b* respectively. New initial positions of the belts or cables 74, 76 result in a new speed ratio between the input and output shafts 62, 46. While the spirally splined shaft 71 moves from side to side, the capstans 66*a, b*, 68*a, b*, are positioned by bearings 75 and fixed frame members 92.

Figure 5:
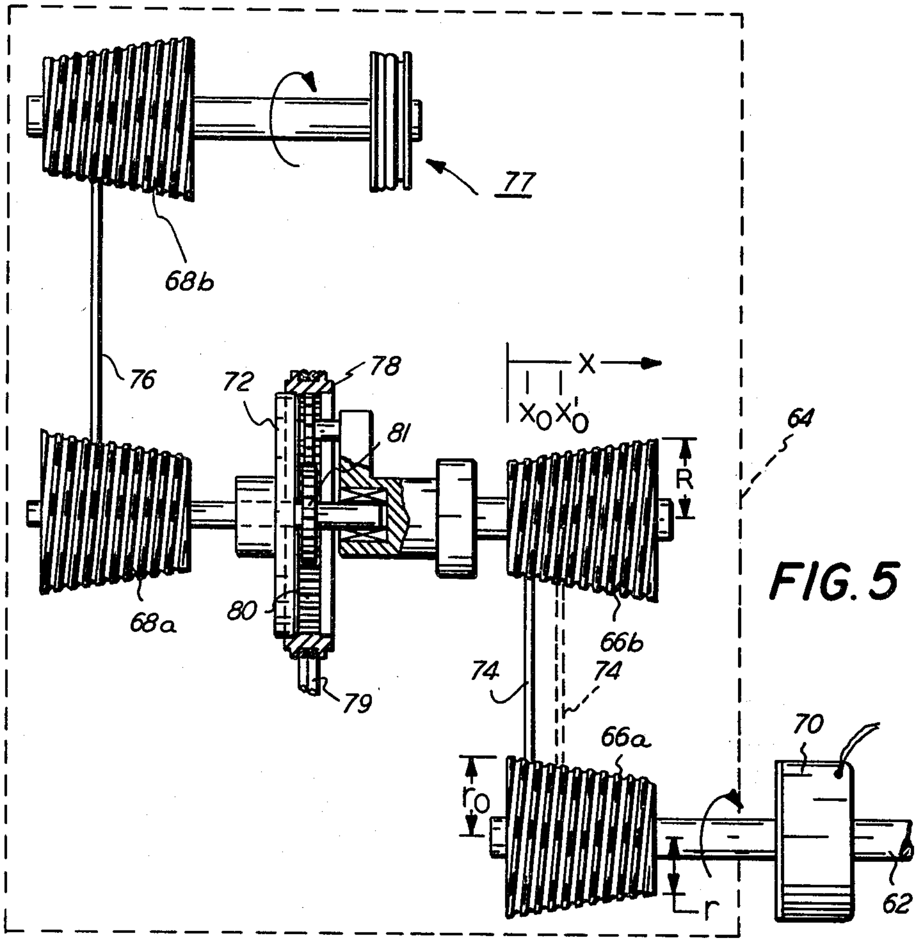
FIGS. 5–9 shows alternate embodiments of suitable variable speed transmissions.

A second embodiment of the transmission 64 is shown in FIG. 5. In this second embodiment the capstan pairs 66*a, b* and 68*a, b* are coupled by a planetary differential 72. Repositioning of the belt 74 is achieved by operating the planetary differential with the clutch 70 disengaged. A differential ring gear 78 is rotated by a belt 79 causing a planetary gear 80 to rotate relative to a sun gear 81. Since the planetary gear 80 is coupled to the capstan 66*b* (FIG. 3) movement of the ring gear 78 walks the cable 74 along the capstan pair 66*a, b*. To initiate scanning the ring gear 78 is fixed, the clutch 70 engaged, and the planetary element 78 rotates the sun gear 81 which, in turn, rotates the capstan pair 68*a, b*.

Figure 4:
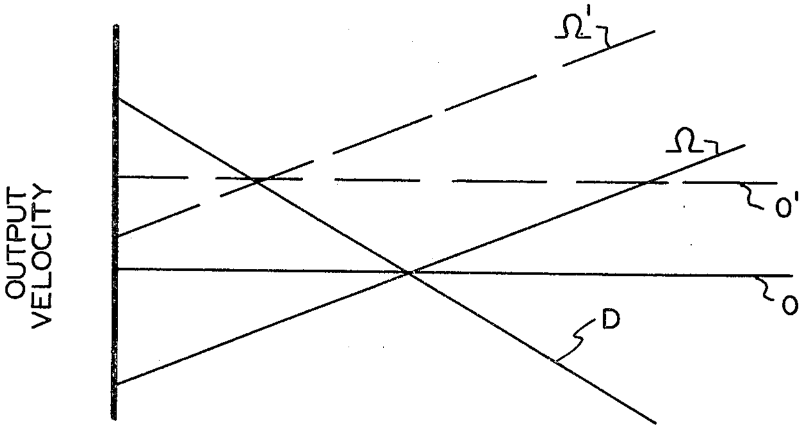
FIG. 4 is a graph showing rotational speed for capstan pairs utilized in the FIG. 3 embodiment.

FIG. 4 shows two angular speeds O, O' of the optics shaft 46 for two different initial belt positions $x_o$, $x_o'$ (FIG. 3) along the capstan pair 66a, 66b. For both initial positions $x_o$, $x_o'$ the capstan 66b rotates with increasing speeds Ω, Ω'. The velocity profiles Ω, Ω' are displaced with respect to each other so when combined with the decreasing velocity profile D of the second capstan pair 68a, 68b the optics shaft speeds O, O' are constant for a particular initial condition. By selectively choosing that initial condition the speed of the shaft 46 may be selectively and continuously varied to provide a continuously variable magnification capability.

Once the transmission 64 has transmitted power from the drive motor output shaft 62 to the optics shaft 46 to scan the mirrors 22, 24 across the platen, the scanning optics are driven in an opposite direction to reposition the mirrors 22, 24 for subsequent scans. To accomplish this flyback, the scanning system preferably comprises a spring 82 (FIG. 2) which is tensioned through rotation of the optics shaft 46. During positive drive of the scanning optics the spring 82 is tensioned and exerts a torque on the scanning optics shaft 46 opposite to the torque exerted by the capstan 86b. When the clutch 70 is disengaged, the spring 82 reverses the direction of optics shaft rotation to drive the scanning mirrors 22, 24 back to an initial position indicated by positions S and C in FIG. 1 respectively. Since the optics shaft is still coupled to the capstan drives in the transmission 64 through the pulley and drive cable 77, the reverse rotation caused by the tensioned spring 82 also reverses the rotation of these capstan pairs, 66a, b and 68a, b to reposition those capstans for subsequent scanning. It should be appreciated by those skilled in the art that to accomplish the flyback scanning in this manner, the energization and deenergization of the clutch 70 must be coordinated with the scanning as well as changes in the magnification. It should also be appreciated that care must be taken to insure that the capstan pairs 66a, b and 68a, b are never rotated to such an extent that the belts 74, 76 "walk" off the ends of their respective capstans.

Figure 6:
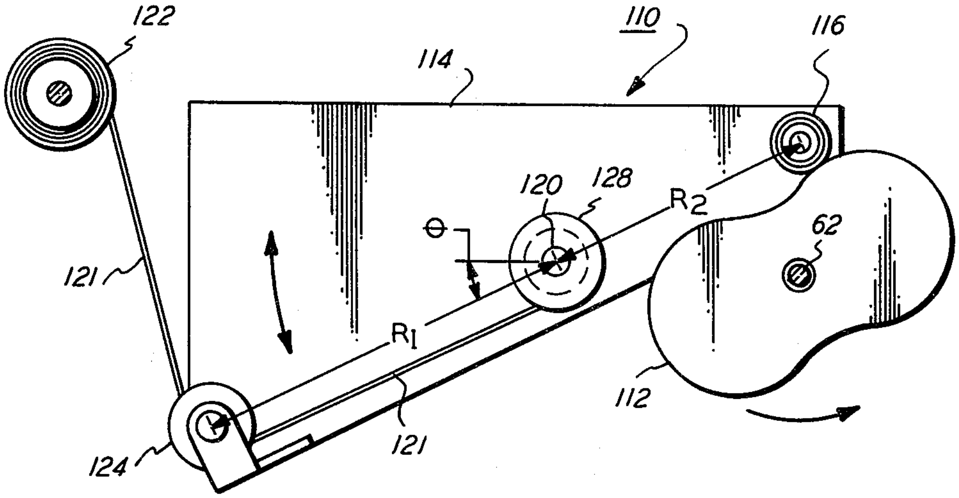
Figure 7:
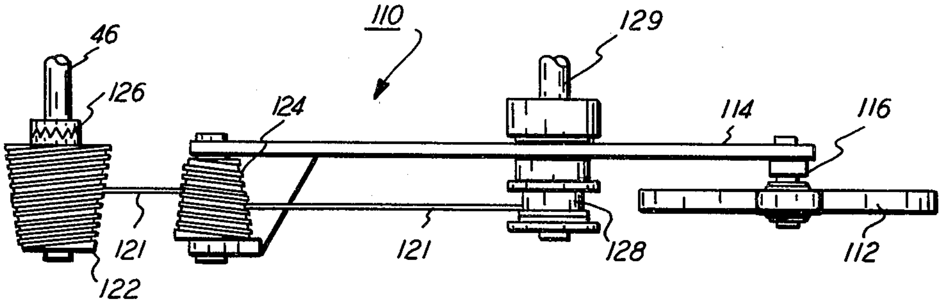
Figure 8:
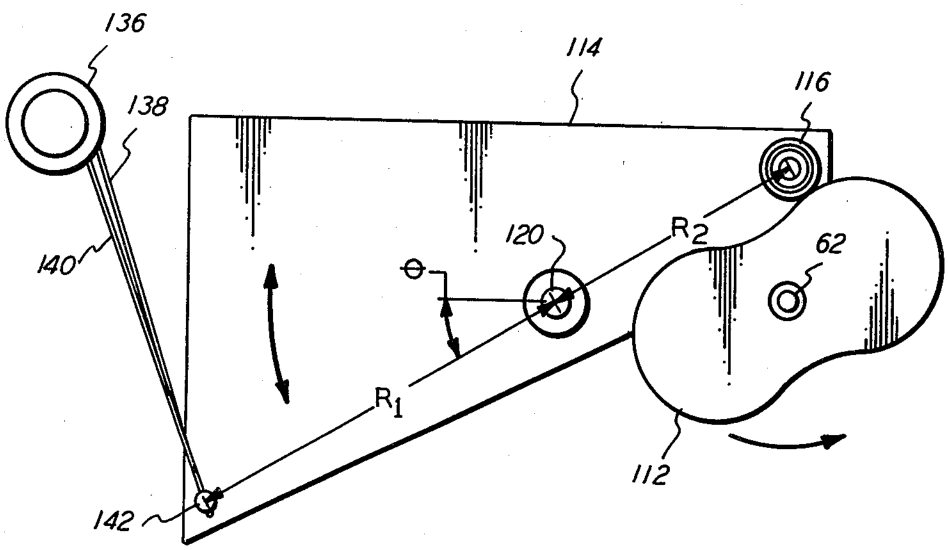

Two alternative embodiments of the invention are shown in FIGS. 6-8. In FIGS. 6 and 7, a continuously adjustable drive transmission 110 is shown comprising a cam 112 mounted to the motor shaft 62 and coupled to a pivot arm 114 through cam following surface 116. The pivot arm is mounted for rotation about a pivot point 120 and rotation of the motor drive shaft 62 causes a pivoting of the arm due to coaction between the cam 112 and the cam following surface 116. Rotation of the arm 114, in turn, pulls a cable 121 to cause rotation of an angled or conical capstan 122 having a spiralling groove for coacting with the cable 121.

An idler arm 124 is mounted to the pivoting arm 114 and has an appropriate pitch in its spiralling groove to correctly align the cable 121 when the wrap position of the cable on the capstan changes in response to movement of the pivot arm. It should be appreciated from the discussion of the FIG. 3 embodiment that the velocity profile produced by the idler arm 124 and capstan 122 produces a constantly changing speed of rotation. To compensate for this varying speed, an inverse velocity profile is built into the cam surface to provide a constant velocity output to the optics drive shaft 46.

Figure 10:
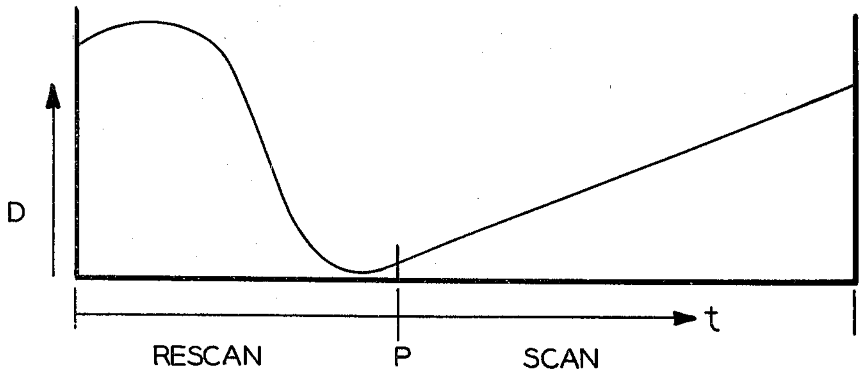
FIG. 10 shows a cam displacement function as a function of time for the embodiments illustrated in FIGS. 6–9.

The cam profile is developed to provide a displacement of the following surface 116 from the shaft 62 as a function of time as illustrated in FIG. 10. This displacement is generated by a constant angular velocity input from the shaft 62. During the scan portion the relation between displacement and time is a linear relation such as $D=C_1 t$, where $C_1$=a constant. During rescan, the relation between displacement and time need only result in getting the deplacement between the surface 116 and shaft 62 back to a minium and may, for example, be expressed as either of the following relations. RESCAN:

$$Disp\,(t) = C_2\left[\frac{t}{P} - \frac{1}{2\pi}\sin\left(2\pi\frac{t}{P}\right)\right]$$

(cycliodal), where P=time for flyback or $$Disp\,(t) = \frac{A_5t^7}{42} + \frac{A_4t^6}{30} + \frac{A_3t^5}{20} + \frac{A_2t^4}{12} + \frac{A_1t^3}{6} + \frac{A_0t^2}{2} + C_1t + C_2 \text{ (Polynominal)}$$

where: $C_1$, $C_2$, $A_0$, $A_1$, $A_2$, $A_3$, $A_4$, $A_5$ are appropriate coefficients to meet conditions of scan length, scan velocity, acceleration and jerk.

The cam profile (i.e. angular position φ(t) and instantaneous cam radius r (t) are developed from geometry of the pivoting arm 114, pivot center 120 and cam shaft 62. By way of example the cam co-ordinates in degrees (φ) and cam radius in linear dimensions (r) can be represented by the following relationships:

Cam angular position and instantaneous radius $$\phi\,(t) = \frac{360}{N} \times \frac{t}{P} + \phi_1$$

$$r\,(t) = \sqrt{r_1^2 + z^2 - 2(z)r_1\cos\phi_2}$$

where:

$$\phi_1 = \sin^{-1}\left[\frac{r_1 \times \sin\phi_2}{r_2}\right]$$

$\phi_2 = 180 - \theta/2$ $z = 2\,R_2 \sin(\phi/2)$ $\theta = \text{Disp}\,(t)/R_2$ $r_1$=Base radius of cam N=number of lobes on cam The capstan 122 is connected to the optics drive shaft 46 through a clutch 126. The cable 121 is fixed at one end to a rotating drum 128 whose axis of rotation coincides with the pivot point 120 of the arm 114. To change the degree of magnification, the clutch 126 is disengaged and the drum 128 is rotated by an appropriate drive (not shown) through a shaft 129. Since the speed of movement of the cable 121 caused by rotation of the arm 114 is constant and defined by the shape of the cam 112, winding or unwinding the cable 121 with respect to the capstan 122 changes the speed of rotation of the capstan 122 in a manner identical to that discussed above with respect to the FIG. 3 embodiment.

Figure 9:
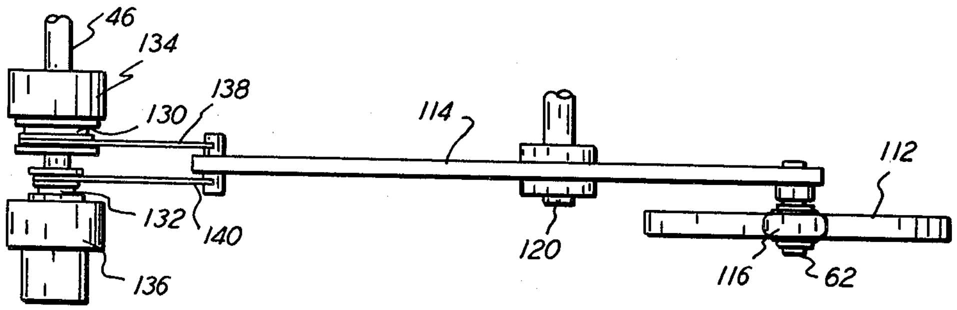

A slightly simplified version of this alternative embodiment is shown in FIGS. 8 and 9. In this embodiment, only discrete magnifications are possible. The cam arm and capstan arrangement is basically the same as that illustrated in FIGS. 6 and 7, however, the conical capstan of those figures has been replaced with two capstans 130, 132, each having a different constant radius. Each of the constant radius capstans is coupleable to the optics drive shaft 46 by individually activated clutches 134, 136. Only one of these clutches would be engaged at a given time and the actual speed of rotation depends upon which capstan drives the shaft 46.

In this embodiment of the invention no adjustment of the wrap of a drive cable with respect to the capstans 130, 132 is needed. Two cables 138, 140 are merely secured to the arm 114 at a point 142, secured to their respective capstans 130, 132 and wind and unwind from those capstans in response to pivoting of the arm 114 by the cam 112. Since the capstans 130, 132 have constant diameters, the cables must have constant linear speed and therefore the cam 112 must be modified from the FIGS. 6 and 7 embodiment to provide uniform capstan speed of rotation.

In those embodiments which utilize the cam 112 and cam follower 116 the constant speed output is generated when the idle arm 124 (FIG. 6) or point 142 (FIG. 8) to which the cables are attached are moving downward or away from the rotating capstan. During flyback the direction of rotation is reversed and during this reversal the cables 121, 138, 140 must be tensioned to keep the cam follower 116 in contact with the cam 112. In the FIG. 6 embodiment this tensioning is provided by the spring 82 so long as the clutch 126 is engaged. In the FIG. 8 embodiment, however, since one of the two capstans 130, 132 is always disengaged from the shaft 46 a separate flyback force must be provided to rewind each of the cables 138, 140. This preferably comprises a separate spring coupled to each capstan 130, 132 which is tensioned whether or not its associated capstan is coupled to the shaft 46. Then, during scan flyback both cables 138, 140 will be rewound about their associated capstans 130, 132.

While a preferred embodiment of the invention has been described with a degree of particularity, certain modifications could be envisioned by those skilled in the art. By way of example, it should be appreciated that the present transmission 64 could be used to drive a moving document past a stationary optics system as well as drive the moving optics system past a stationary document. It is thus intended that the invention cover all such modifications which fall within the spirit or scope of the appended claims.

I claim:

1. A variable magnification reproduction machine for providing a continuously variable range of document magnification comprising:

a platen for supporting a document, image receptor means for receiving a flowing light image of said document;

optics for directing said image along an optical path to said image receptor means, and scan means for providing a controlled relative speed of movement between said platen and said optics to control the magnification or reduction of said image in relation to said document; said scan means including:

a first pair of conical capstans drivingly connected by an endless belt which wraps around spiraling grooves along said capstans' length;

means for coupling and decoupling an input capstan of said first pair to a constant speed motion source to rotate said input capstan;

a second pair of conical capstans drivingly connected by a second endless belt which wraps around spiraling grooves along the second pair of capstans;

an output shaft coupled to an output capstan of said second pair of capstans;

a shaft for connecting a non-input capstan of said first pair with a non-output capstan of said second pair so that rotation of said first pair by said constant speed source produces a rotation in said output shaft, and means for providing relative rotation between the non-input capstan of said first pair and the non-output capstan of said second pair when said means for decoupling disengages said input capstan from the constant speed motion so that the speed of rotation of said output shaft is varied when said input capstan is again coupled to said constant speed source.

2. The reproduction machine of claim 1 wherein said non-input and non-output capstans are mounted to a splined shaft movable from side to side so that when said means for decoupling disengages said source said capstan pairs rotate relative to each other to produce a different scan rate when said input capstan is recoupled to said source.

3. The machine of claim 1 wherein said means for providing relative rotation comprises a planetary differential.

4. In a xerographic copier, means for providing a continuously variable range of document magnification comprising:

a platen for supporting a document;

image receptor means for receiving a flowing limit image of said document;

optics for directing said image along an optical path to said image receptor means;

scan means for providing a controlled relative speed of movement between said platen and said optics to control the magnification or reduction of said image in relation to said document, said scan means including an input drive shaft rotatably mounted to said copier such that rotation of said shaft causes said scan means to provide said relative movement; and transmission means for coupling a substantially constant speed source of rotational motion to said shaft, said transmission means including:

means for defining a cam surface coupled to said substantially constant speed source of rotational motion;

a pivotally mounted drive having a cam following member coacting with said cam surface, said pivotally mounted drive further including means for securing a flexible cable at or near a drive pivot point and means removed from said pivot point coacting with said cable to move said cable in relation to said copier, and means coupleable to said shaft and including capstan to which said cable is connected and defining a spiraling groove configured to rotate with constant speed as said cable unwinds from said capstan.

5. The copier of claim 4 which further comprises means for decoupling said shaft from said capstan and means for controllably rotating said capstan in relation to said copier to change the speed of shaft rotation when said capstan is again coupled to said shaft.

6. In a xerographic copier, means for providing a discrete range of document magnifications comprising:

a platen for supporting a document;

image receptor means for receiving a flowing light image of document;

optics for directing said image along an optical path to said image receptor means;

scan means for providing a controlling relative speed of movement between said platen and said optics to control the magnification or reduction of said image in relation to said document, said scan means including an input drive shaft rotatably mounted to said copier such that rotation of said shaft causes said scan means to providing said relative movement; and transmission means for coupling a substantially constant speed source of rotational motion to said shaft, said transmission means including:

means for defining a cam surface coupled to said substantially constant speed source of rotational motion;

a pivotally mounted drive having a cam following member coacting with said cam surface;

a cable secured to said pivotally mounted drive which moves in relation to said copier as said surface and said drive coact, said surface and drive providing constant linear speed of cable motion in response to rotation of said source;

first and second capstans mounted for rotation about said shaft having different constant radius surfaces for coacting with said cable to produce a constant speed of capstan rotation; and means for selectively coupling said capstans to said shaft to provide said discrete magnifications.

7. The reproduction machine of claim 1 or 2, or 6 wherein said variable speed drive means is coupled to said optics to move said optics in relation to a stationary document.

* * * * *

UNITED STATES PATENT AND TRADEMARK OFFICE
CERTIFICATE OF CORRECTION

PATENT NO. : 4,368,976

DATED : January 18, 1983

INVENTOR(S) : David K. Shogren

It is certified that error appears in the above-identified patent and that said Letters Patent are hereby corrected as shown below:

Claim 4, at column 10, line 29, cancel "limit" and insert - -light- -.

Claim 7, at column 12, line 14, cancel "claim 1 or 2, or 6" and insert - -claim 4 or 6- -.

Claim 7 at column 12, line 15, cancel "variable speed drive" and insert - -transmission- -.

Signed and Sealed this

*Fifth* Day of *March 1985*

[SEAL]

*Attest:*

DONALD J. QUIGG

*Attesting Officer* *Acting Commissioner of Patents and Trademarks*